United States Patent [19]

Tanaka

[11] 4,133,608
[45] Jan. 9, 1979

[54] ELECTROMAGNETIC SHUTTER RELEASE DEVICE

[75] Inventor: Harumi Tanaka, Kobe, Japan

[73] Assignee: Minolta Camera Kabushiki Kaisha, Osaka, Japan

[21] Appl. No.: 805,954

[22] Filed: Jun. 13, 1977

[30] Foreign Application Priority Data

Jul. 5, 1976 [JP] Japan .................................. 51-79062

[51] Int. Cl.² .............................................. G03B 9/08
[52] U.S. Cl. .................................... 354/235; 354/234; 354/266
[58] Field of Search ...................... 354/60 R, 204, 234, 354/235, 237, 238, 245, 246, 266, 267

[56] References Cited

U.S. PATENT DOCUMENTS

| 3,466,993 | 9/1969 | Fahlenberg et al. | 354/235 |
| 3,635,141 | 1/1972 | Starp et al. | 354/235 |

FOREIGN PATENT DOCUMENTS 47-34096 10/1972 Japan.
48-42503 12/1973 Japan.
49-104623 10/1974 Japan.
50-109723 8/1975 Japan.

Primary Examiner—Russell E. Adams
Attorney, Agent, or Firm—Wolder, Gross & Yavner

[57] ABSTRACT

An electrical shutter release system includes a shutter release mechanism releasably locking the shutter in cocked position and spring biased to a retracted position, a lock mechanism releasably locking the release mechanism in its advanced shutter locking position and including an armature movable therewith, a charge spring biasing the lock mechanism in its advance lock position. A permanent magnet flux core retains the armature in advanced position and carries a solenoid which is momentarily energized to counteract the permanent flux and release the armature to effect the spring retraction of the lock and release mechanisms. The retraction of the release mechanism effects the return of the armature to permanent magnetic flux engagement with the core and the cocking of the shutter effects the cocking of the release mechanism and the loading of the lock mechanism spring. A manually actuated mechanism is provided for releasing the armature from the core in the event of malfunctioning of the solenoid energizing network.

15 Claims, 6 Drawing Figures

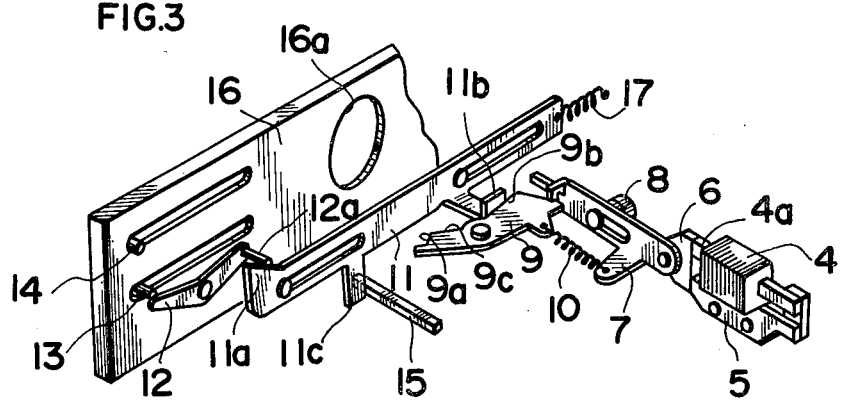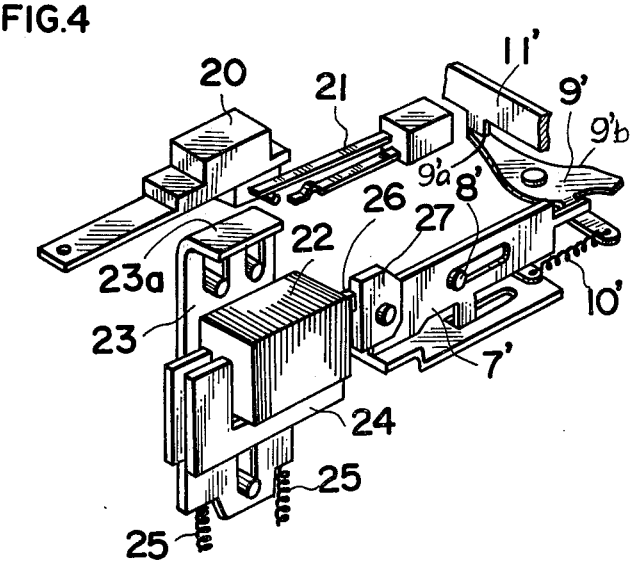

ELECTROMAGNETIC SHUTTER RELEASE DEVICE

BACKGROUND OF THE INVENTION

The present invention relates generally to an improved electromagnetic shutter release device and it relates more particularly to an improved electromagnetic shutter release device employing a combination magnet including a magnetic core, a permanent magnet and an electromagnet solenoid in operatively associated relation.

DESCRIPTION OF THE PRIOR ART

In an electromagnetic shutter release device of the type in which the shutter is released as an armature is retracted or moved away from a magnetic core by a shutter-releasing operation, the armature is spring biased toward quick disengagement from the core in order to ensure that the releasing action will immediately occur with the shutter-release operation. Since the armature will accordingly remain disengaged from the core after each shutter release, it is necessary to reset the armature into abutment or engagement with the core by overcoming the biasing force of the biasing or operating spring.

This resetting action has been accomplished either with the release member of the shutter-release mechanism in association with the shutter-releasing action or otherwise in association with a subsequent shutter-charging or cocking operation. In either case, the resetting must be accomplished against the biasing force of the operating spring and this fact is responsible for the numerous disadvantages heretofore encountered. Thus, in the latter system, a drag is imposed on the shutter-charging action while, in the former system, the shutter-release action must take place against an increased biasing force which could lead to a blurred picture as the release-action member could rebound after it has reached its final position.

This disadvantage might be obviated by decreasing the degree of loading of the operating spring, but, if this be done, there will be other additional problems such as a delayed and unstable shutter releasing action.

SUMMARY OF THE INVENTION

It is accordingly an object of the present invention to provide an electromagnetic release device of the type including a combined permanent and electromagnetic device which effects a lighter or easier shutter cocking operation or a reduction in the driving force for other operations of the camera.

Another object of the present invention is to provide an electromagnetic release device of the above described type, in which biasing means for urging an armature to retract from the magnet core is kept discharged or inactive when the armature is reset into engagement with the core, thereby obviating the need to provide a great force for the reset of the armature.

To accomplish these objects, an electromagnetic release device of the present invention is provided with a combined magnet in which energization of an electromagnet solenoid cancels the attractive force of an associated permanent magnet, which permanent magnetic force serves to attract an armature to the core. Means is provided for releasably holding a shutter release mechanism in its cocked position, and releasing operation initiating means including the armature is adapted to be movable to disable the holding means to allow the release of the shutter release mechanism. With the armature attracted to the core, biasing means, normally discharged or inactive is charged to store a biasing force by charging means which is actuated in response to the cocking of the shutter release mechanism. The biasing means, under the stored force is capable of retracting or separating the armature from the core and also capable of moving the releasing operation initiating means to disable the holding means upon the cancellation of the attractive force of the permanent magnet. After the retraction or separation of the armature from the core, the biasing means becomes discharged or inactive again. The stored biasing force of the biasing means is smaller than the attractive force of the permanent magnet such that the armature continues to be attracted to the core under the permanent magnet attractive force against the stored biasing force after the charging of the biasing means. Furthermore, the electromagnetic release device of the present invention is provided with means which resets or returns the releasing operation initiating means to a position in which the armature again engages the core with the biasing means maintained in the discharged or inactive condition at any time after the releasing operation initiating means disable the holding means to allow the release of the shutter release mechanism.

With the above construction, a large force is unnecessary to drive the resetting means because the biasing means is in the discharged or inactive condition upon and during the resetting. Thus, no rebound movement, which may cause blurring of a picture to be taken, will occur due to the resetting means drive if the latter is associated with the release of the shutter release-mechanism. In addition, an operation to store the driving force can be done with a relatively small force.

In a preferred embodiment of the present invention, the holding means, charging means and resetting means commonly includes, as a part thereof, a swingable member having two arms, and the releasing operation initiating means includes a movable member coupled with the armature and movable in the direction to contact and strike one arm of the swingable member at substantially a right angle thereto. The one arm of the swingable member is provided with a portion capable of being associated with the shutter release mechanism when the mechanism is moved to its rest position from its cocked position. The swingable member thus associated with the mechanism is swung to push back the movable member, by the one arm to a position where the armature is reset into engagement with the magnetic core. Between the one arm of the swingable member and an arm of the movable member laterally projecting therefrom is connected a spring which constitutes the biasing means and which is normally discharged. As the swingable and movable members move together while maintaining contact with one another during the resetting of the armature, the spring is kept discharged. The armature is attracted to the core by the permanent magnet flux or attractive force simultaneously with the resetting since the circuit for energizing the electromagnet solenoid discontinues energization a short time after the energization occurs.

Further, the other arm of the swingable member is provided with a portion engageable with the shutter release mechanism when the mechanism is moved to its cocked position from its rest position in response to cocking operation thereof. The swingable member thus associated with the mechanism is swung to retract the one arm from the movable member, so that the spring is charged to store the biasing force. The other arm of the swingable member is further provided with another portion releasably engaging the shutter release mechanism when the mechanism reaches its cocked position. The engagement thus achieved is maintained under the biasing force of the charged spring.

Upon the retraction or separation of the armature from the core, the movable member is moved to strike the one arm of the swingable member under the stored biasing force of the spring, thereby swinging the swingable member. Then, the engagement is released, and thus the shutter release mechanism is allowed to move its rest position for release of a shutter.

As apparent, the improved mechanism is simple in construction because of the common use of the swingable member as a part of the holding means, charging means and resetting means.

In another preferred embodiment of the present invention, arrangement is provided for the case where the energization of the electromagnet cannot occur due to the exhaustion of the electric power source or any malfunctioning in the energizing circuit. That is, the core, electromagnet solenoid and permanent magnet are mounted on a movable member which is disposed in the path of movement of a manual release member. Also in the path of movement of the manual release member is disposed a switch which is closed to actuate the energizing circuit at an initial stage of the movement of the manual release member. With this construction, the release of the shutter mechanism is effected when the electromagnet solenoid remains de-energized even after the closing of the switch because operation of the manual member to a position where it engages the movable member shifts the same and forces the core to slide on and release the armature from the attractive magnetic force, thereby allowing the armature to be retracted from the core under the stored biasing force of the spring.

The above and other objects and features of the present invention will become more apparent from the following description taken in conjunction with the accompanying drawings.

BRIEF DESCRIPTION OF THE DRAWINGS

FIGS. 2(A), 2(B) and 2(C) are fragmentary perspective views thereof at various operational stages, wherein FIG. 2(A) is at the moment when the armature is retracted from the core due to the release operation, FIG. 2(B) is at the moment when a member coupled with the armature strikes the locking member after the retraction of the armature from the core, and FIG. 2(C) is immediately after the shutter release member is disengaged from the locking member;

FIG. 3 is a perspective view thereof immediately after the armature is reset to contact the core and the shutter release member releases the shutter opening member; and FIG. 4 is a perspective view of another embodiment of the present invention, at a stage after accomplishment of the shutter cocking and prior to the release operation.

DESCRIPTION OF THE PREFERRED EMBODIMENTS

Figure 1:
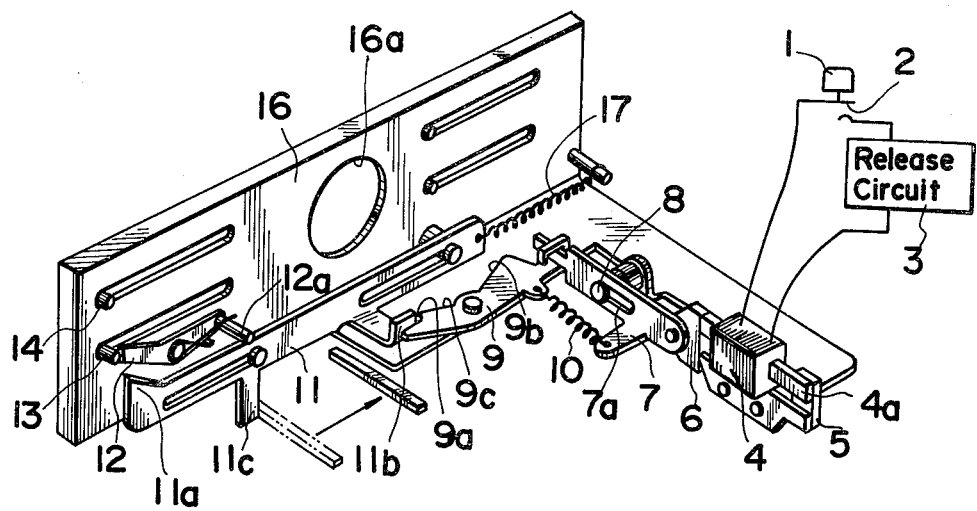
FIG. 1 is a perspective view of the assembled components of a mechanism embodying the present invention in a shutter cocked condition and prior to the release operation.
Figure 2A:
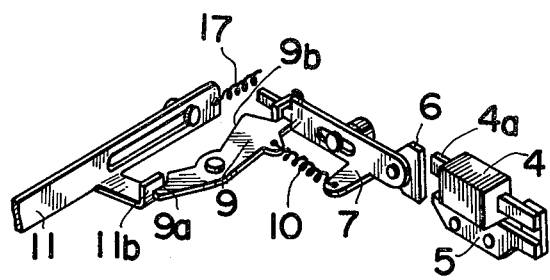
Figure 2B:
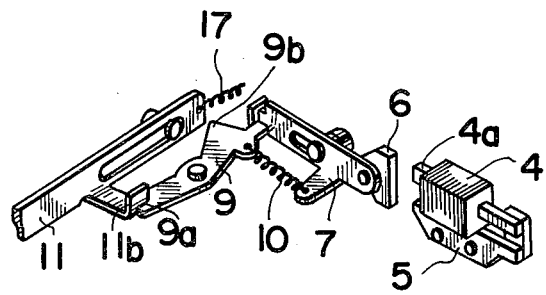

Referring now to the drawings, particularly FIG. 1 to FIG. 3 thereof, which illustrate a preferred embodiment of the present invention, a shutter button 1 is adapted so that, upon being depressed, it will close a normally open power switch 2 of a shutter release circuit 3. The closing of power switch 2 causes the circuit 3 to generate an output in a known manner which lasts for a short period of time.

A solenoid or coil 4 which is actuated or energized by the output of the shutter release circuit 3 which has an output as above, engages or encircles a core 4a which is provided with a permanent magnetic flux by virtue of the action of a permanent magnet 5, thus constituting a combination magnet consisting of an electromagnet induced by solenoid 4, core 4a and permanent magnet 5.

Thus, when the electromagnet 4 is deenergized, the magnetic core 4a is magnetized by the permanent magnet 5 and as the solenoid 4 is energized it produces a magnetic flux which counteracts or negates the permanent magnetic flux in the core 4a, the magnetic flux produced by energized solenoid 4 being of inverse polarity with respect to the magnetic flux force of the permanent magnet 5 and acts to cancel the latter force, with the result that the magnetic core 4a loses its magnetism.

An armature 6 carried by a support slide faces magnetic core 4a, and is magnetically held in abuttment with the core 4a, while the electromagnet 4 remains deenergized, retaining its position as attracted to the core 4a against the retraction influence of a repellent tension spring 10 which acts to retract the armature 6 and support bar 7 from the core 4a. As the electromagnet 4 is energized, however, the magnetic core 4a virtually loses its magnetic force so that the armature 6 is retracted away from the core 4a under the influence of the tension spring 10.

The support bar 7 is slidable along and guided with a pin 8 rigidly mounted on a shutter base plate 16 with one end of the support bar 7 being affixed to the armature 6. A lock lever 9 is pivoted between its ends and is connected to support bar 7 by tension spring 10 and biased to rotate in a clockwise direction by spring 10, the lever 9 being pivotally mounted on the shutter plate 16 so that it may rotate with respect to the camera body not shown. The lock lever 9 is engageable, at one end thereof, with a corresponding first end of the support bar 7. An inclined portion 9a of the other end of lock lever 9 is engageable with a bent portion 11 b of a release sensor 11 to be hereinafter described so that when the armature 6 is in abutting contact with the core 4a, it locks the release sensor 11 in its charged or cocked position under the biasing force of tension spring 10, the tension of which has been generated by such engagement and so that as the armature 6 is released from the magnetic core, the release sensor 11 is released from its charged or cocked position.

The lock lever 9 is further provided on the arm thereof engageable with support bar 7 with a resetting projection 9b having an inclined cam face which is in the path of and may come into abutting emgagement with the bent portion 11b of the release sensor 11 when the latter is released.

The release sensor 11 is biassed by a tension drive spring 17 connected between release sensor 11 and the base plate 16 toward its rest position at the right and is slidable substantially parallel to a shutter opening member 13 and a shutter closing member 14 which are slidably guided by the shutter base plate 16 in traverse directions with respect to the base plate 16 which is rigidly secured to the camera body and which has an exposure opening 16a. The release sensor 11 is slidable to the left against the spring biassing influence when a shutter charge lever 15 is moved to the left by the camera winding operation as the lever 15 pushes a projection 11c depending from sensor 11 below the base plate 16. Incidentally, through linkages not shown, the shutter opening and closing members are also charged or cocked by the movement of the lever 15 to the left.

A lock lever 12 is adapted to releaseably lock the shutter opening member 13 in its charged or cocked position is pivotally mounted on the base plate 16 and is spring biased in a clockwise direction and includes a pin 12a engageable with a raised portion 11a of the release sensor 11.

Although not shown, there is also provided a lock lever adapted to lock the shutter closing member 14 in charged or cocked position. This latter lock lever releases the shutter closing member at a desired interval of exposure time following the unlocking of the shutter opening member through the action of a mechanical or electrical delay means which is not shown but may be of the known type.

The release sensor 11 is locked in charged or cocked position as its bent portion 11b is engaged by and passes against the inclined face 9a of the clockwise biased lock lever 9.

Considering now the release of the shutter which is in charged or cocked position as illustrated in FIG. 1, the electromagnet 4 is instantly or pulse energized as the release button 1 is depressed to close the power switch 2 and, as a result, the magnetic core 4a loses its overall magnetism. As a result, the armature 6 heretofore attractedly abutting the core 4a is retracted or pulled away, together with the support bar 7, from the core 4a by the tension spring 10 as shown in FIG. 2(A). By its momentum, the support bar 7 strikes or engages the lock lever 9, imparting a counterclockwise rotation to the latter. At the same time, in the above situation, the energy stored in the tension spring 10 is completely dissipated so that the armature 6, support bar 7 and lock lever 9 are set free with respect to the base plate 16 and the camera body. Thus, the support bar 7 is now slidable and the lock lever 9 is rotatable as described above.

Figure 2C:
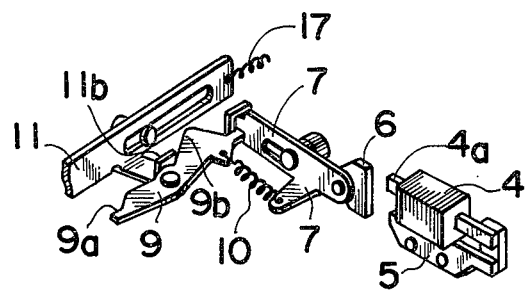

Moreover, the release sensor 11 which is biasedly drawn by the tension drive spring 17 is urged to move to the right and its bent position 11b causes the lock lever 9 via its inclined face 9a to rotate slightly in a counterclockwise direction until the bent portion 11b is disengaged from the inclined face 9a as shown in FIG. 2(C). Since, as a result, the release sensor 11 is displaced to the right, the bent portion 11b comes into abutting contact with the resetting projection 9b as illustrated in FIG. 3, thus driving the lock lever 9 in a clockwise direction. Therefore, the lock lever 9, via the support bar 7 engaged therewith, brings the armature 6 into abutment with the core 4a. Since the electromagnet solenoid 4 has already been deenergized, the armature 6 is thereupon magnetically attracted to the core 4a.

In association with the displacement to the right of the release sensor 11 by the above operation, the raised portion 11a of the release sensor 11 advances into engagement with the pin 12a of the opening member lock lever 12 and thereby drives the lock lever 12 in a counterclockwise direction, releasing the shutter lever 12 in a counterclockwise direction, releasing the shutter opening member from its charged or cocked position as illustrated in FIG. 3 and thereby, causing an exposure to take place. After the commencement of said exposure, a delay means not shown releases the locking member which locks the shutter closing member, likewise not shown, in a conventional manner to terminate the exposure.

By the charging action of the charge lever 15, not only the shutter but also the release sensor 11 is charged or cocked. As the bent portion 11b of the sensor 11 overrides the inclined face 9a of the lock lever 9 and is locked, the energy in the tension spring 10 which has been dissipated as above is reaccumulated.

It is apparent that, in the above described embodiment, since the energy of spring 10 has been dissipated when the armature 6 is pressed against the core 4a, no significant force is required for that pressing action. Moreover, since the time during which the armature 6 is kept away from the core 4a is only momentary, depositing of foreign matter on the abutting faces of the armature 6 and core 4a is prevented. It should, however, be understood that since this embodiment is such that no release action can take place unless the electromagnet solenoid 4 is energized, it is impossible to release the shutter when the power source or battery has been consumed or there is a disconnection or other failure in the electromagnetic release system. The embodiment illustrated in FIG. 4 incorporates a countermeasure for overcoming this drawback, and permits mechanical releases in such emergencies.

Referring now to FIG. 4, a support bar 7' carrying an armature 27, a guide pin 8', a lock lever 9' rotatable in engagement with the right-hand end of the support bar 7', a repellent or tension spring 10' biased between the lock lever 9' and support bar 7', a release sensor 11' which is releasably locked in charged and cocked position by the lock lever 9', and other structural shutter elements are of the same construction as, and functionally correspond to the respective elements of the first embodiment described hereinbefore, provided however, that whereas the first embodiment features the combination magnet consisting of elements 4, 4a and 5 as rigidly secured to the camera body, this second embodiment is such that an electromagnet 22, a permanent magnet 24 and a core 26 which, taken together, constitute a combination magnet is rigidly mounted on a sliding plate 23 in such a manner that it may slide with respect to the camera body in a direction substantially normal to the direction of movement of an armature 27 so that the core 26 and the armature 27 are mechanically separable.

Thus, disposed immediately under a release button 20 biased to a raised position with respect to the camera body is a normally open power switch 21 corresponding to the power switch 2 of the shutter release circuit 3 of the first embodiment. Disposed further thereunder is a bent portion 23a of the sliding plate 23 which is biased to ascend back under the influence of a resetting spring 25. The aforesaid combination magnet consisting of electromagnet solenoid 22, permanent magnet 24 and core 26 is rigidly mounted on sliding plate 23, and when the sliding plate 23 is in its raised position, the armature 27 faces the core 26 thereof.

Therefore, depressing the release button 20 closes the power switch 21, whereby in normal condition, the solenoid 22 is energized and the core 26 is demagnetized. Thereupon, as in the first embodiment described above, the support bar 7' and armature 27 are released and retracted from the core 26. Upon abuttment of the support bar 7' against the lock lever 9', spring 10' is deenergized, and the release sensor 11' biased by the drive spring to the right as depicted pushes an inclined face 9'a of the lock lever 9' as earlier described to drive the lever 9' in a counterclockwise direction, thereby disengaging the release sensor 11' from the lock lever 9'.

The release sensor 11' moving to the right pushes a resetting projection 9'b of the lock lever 9' in the course of its trip to drive the lock lever 9' in a clockwise direction. Because the support bar 7' is therefore pushed by the lock lever 9' to the left as illustrated, the armature 27 is reset again to its position abutting the core 26. Since the spring 10' remains deenergized, the force necessary to drive the lock lever 9' in a clockwise direction, that is to say the force required to displace the armature 27 to the position abutting the core, is of a minor magnitude.

In contrast, in the case of a consumed power cell or an electrical disconnection or malfunctioning in the electromagnet circuit, the electromagnet solenoid 22 is not energized even on closure of the power switch 21, so that the armature 27 will not move away from the core 26. In the above situation, if the release button 20 is further depressed, the button comes into abutting contact with the bent portion 23 a of sliding plate 23 to depress the latter, whereby the sliding plate 23 is lowered against the force of the resetting spring 25. Thereupon, the core 26 with the armature 27 attached thereto slides up the armature 27 to reach its upper end, from which it disengages itself from the armature 27, whereupon the armature 27 is pulled away by the spring 10'.

While there have been described and illustrated preferred embodiments of the present invention it is apparent that numerous alterations omissions and additions may be made without departing from the spirit thereof.

I claim:

1. An electromagnetic release device for use in a camera which includes a shutter, said device comprising:
   a shutter release mechanism movable from a cocked position to a rest position for releasing said shutter and from a rest position to a cocked position for releasably locking said shutter in a cocked position;
   means for releasably holding said shutter releasing mechanism at its cocked position;
   a core;
   means for initiating the releasing operation including an armature and being movable to disable said holding means to allow the movement of said shutter release mechanism to its rest position;
   a permanent magnet for providing a magnetic attractive force to attract said armature to said core;
   a solenoid cooperable with said permanent magnet for substantially cancelling said attractive force upon energization of said solenoid;
   means for energizing said solenoid;
   means for biasing said releasing operation initiating means to retract said armature from said core and to move said releasing operation initiating means to a position to disable said holding means;
   means for charging said biasing means to store a biasing force therein, in response to the cocking of said shutter release mechanism when said armature is attracted on said core; said biasing means, under the stored biasing force, being capable of removing said armature from said core and moving said releasing operation initiation means to a position to disable said holding means upon the cancellation of said attractive force of said permanent magnet and being discharged again after accomplishment of the removal of said armature from said core, and said attractive force of said permanent magnet being greater than said stored biasing force of said biasing means; and
   means for resetting or returning said releasing operation initiating means with said biasing means maintained in the discharged condition for resetting said armature onto said core after said releasing operation initiating means disables said holding means.

2. An electromagnetic release device as defined in claim 1, wherein said electromagnet energizing means includes a circuit for energizing said electromagnet for a short period, so that said armature is attracted to said core under said attractive force by said permanent magnet at the time said armature is reset onto said core.

3. An electromagnetic release device as defined in claim 1, wherein said resetting means includes a first portion engageable with said shutter release mechanism during the movement of said shutter release mechanism to its rest position from its cocked position, whereby said resetting means is operated by said shutter release mechanism during the engagement between said first portion and said shutter release mechanism.

4. An electromagnetic release device as defined in claim 3, wherein said releasing operation initiating means includes a first movable member coupled to said armature, said returning means includes a second movable member integral with said first portion and movable to push said first movable member upon engagement between said first portion and said shutter release mechanism for moving said first movable member for resetting said armature onto said core, the relative position of said first and second movable members remaining unchanged during said movement thereof, and said biasing means includes a spring connected normally in discharged condition between said first and second movable members.

5. An electromagnetic release device as defined in claim 4, wherein said charging means includes said second movable member and a second portion integral with said second movable member, said second portion being engageable with said release mechanism during the movement of said shutter release mechanism to its cocked position so as to retract said movable member from said first movable member when said armature is attracted on said core, whereby the relative position of said first and second movable members is changed during the movement of said shutter release mechanism to its cocked position, to charge said spring connected between said first and second movable members.

6. An electromagnetic release device as defined in claim 5 wherein said holding means includes said second movable member and a third portion integral with said second movable member, said third portion being releasably engageable with said shutter release mechanism to hold the same at its cocked position under the biasing force of said spring having been charged when said release mechanism has reached its cocked position, and said first movable member is capable of pushing said second movable member to move the same so that said third portion is disengaged from said shutter releasing mechanism upon the removal of said armature from said core, and said spring being discharged after accomplishment of the disengagement.

7. An electromagnetic release device as defined in claim 6, wherein said shutter release mechanism includes a member engageable with said first, second and third portions.

8. An electromagnetic release device as defined in claim 7, wherein the second movable member is supported for swinging and has a first arm adapted to engage and be engaged with said first movable member and integral with said first portion, and a second arm integral with said second and third portions, said first movable member is supported for reciprocating linear movement in a direction for engaging said first arm substantially at a right angle and has an arm projecting laterally therefrom, and said spring is connected between said first arm of said second movable member and said arm of said first movable member.

9. An electromagnetic release device as defined in claim 8, wherein said first movable member has one end coupled to said armature and the other end capable of engaging and being engaged from said first arm of said second movable member.

10. An electromagnetic release device as defined in claim 2, wherein said camera includes a manual release member operable to move along a predetermined path, and said solenoid energizing means further includes a switch connected to said circuit to actuate the same upon closing thereof and arranged in the path of said manual release member so as to be closed upon the movement of said manual release member.

11. An electromagnetic release device as defined in claim 10, further comprising a movable member disposed in said path of said manual release member at such a position where said movable member is pressed by said manual release member for movement after the closing of said switch, said core, said solenoid and said permanent magnet being fixed on said movable member so that said core slides along said armature having been attracted thereto and then is removed from said armature against the attractive force of said permanent magnet, for permitting the removal of said armature from said core, in response to the movement of said movable member due to the movement of said manual release member, whereby the release of said shutter release mechanism is effectable even when said electromagnet remains deenergized upon closing of said switch due to any malfunctioning of said circuit.

12. In a camera including a shutter movable between a cocked and a retracted position, a shutter release system comprising release means movable between an advanced lock position releasably locking said shutter in cocked position and a spring biased retracted position releasing said shutter, lock means releasably locking said release means in its advanced position and including an armature of magnetic material and movable between said advanced position and a retracted position releasing said release means with the respective movement of said armature between an advanced and retracted position, spring means when loaded biasing said lock means to its retracted position and being unloaded when said lock means is in its retracted position, a magnetic core having a permanent magnet flux and magnetically releaseably retaining said armature in its advance position in engagement with said core and against the influence of said spring means, a solenoid coupled to said core, solenoid energizing means for applying a current to said solenoid of a value and direction to produce a magnetic flux in said core opposite said permanent magnetic flux to release said armature and effect the retraction of said armature and lock means under the influence of said spring means to release said shutter release means, means for advancing said armature into retaining magnetic engagement with said core under the influence of the permanent magnetic flux therein in response to the retraction of said shutter release means and in the absence of substantial loading of said spring means and means responsive to the cocking of said shutter for loading said spring means.

13. The shutter release system of claim 12 including means responsive to the cocking of said shutter for advancing said release means.

14. The shutter release system of claim 12 wherein said solenoid energizing means applies a momentary electric pulse to said solenoid.

15. The shutter release system of claim 12 including manually operable means for releasing said armature from said core independently of the application of current to said solenoid.

* * * * *